Patented Sept. 12, 1950

2,521,805

UNITED STATES PATENT OFFICE 2,521,805

PROCESS FOR EXTRACTING ACONITINE

Edward F. Rogers, New York, N. Y., assignor to Merck & Co., Inc., Rahway, N. J., a corporation of New Jersey No Drawing. Application November 2, 1944, Serial No. 561,519

5 Claims. (Cl. 260—236)

This invention relates to a process for obtaining the alkaloid aconitine.

Aconitine is a poisonous narcotic alkaloid present in root tubers and other plant parts of certain species of plants of the genus Aconitum, particularly tubers of the species *Aconitum napellus*. It is an acetyl-benzoyl-aconine having the formula $C_{34}H_{47}NO_{11}$, and in the pure state is a white crystalline solid, m. p. 202.3° C. It is soluble in alcohol, ether, and chloroform but almost insoluble in water and petroleum ether.

Aconitine is useful in the treatment of certain fevers and is important as a remedy for neuralgia, particularly of the 5th Cranial nerve.

According to known methods for preparing aconitine ground roots or tubers of *Aconitum napellus* have been extracted with an organic solvent such as ethanol, alone or in combination with small amounts of tartaric acid or calcium carbonate. These processes are objectionable, however, because of the large volume of alcohol needed for the extraction and further because alcohol also extracts considerable amounts of undesired resinous and fatty material that must be removed before the aconitine can be concentrated and purified.

It is now discovered according to the process of the present invention that although aconitine has low solubility in water, it surprisingly is possible and highly practicable to extract aconitine from ground plant parts with an aqueous solvent. This procedure serves not only to reduce the cost of the extraction process by eliminating need for more costly organic solvent, but also serves to simplify the concentration and purification of the aconitine because very little resinous or fatty material is extracted by the aqueous solvent.

Regarded in certain of its broader aspects the novel process, according to this invention, comprises directly extracting ground parts of plants of the genus *Aconitum* with aqueous solvent to obtain a crude aqueous extract, extracting the aqueous extract with ether, separating and substantially neutralizing the aqueous layer thus formed, saturating the neutralized aqueous layer with salt, extracting with ether, and obtaining aconitine from the extract, for example, by drying the combined ether extracts, concentrating the ether solution to small volume, crystallizing aconitine by addition of petroleum ether, and purifying the crystalline product by recrystallizing from absolute ethanol. The extracting solvent employed can be water or a mildly alkaline or mildly acidic aqueous solution, water being preferred.

The following example illustrates a method of carrying out the present invention, but it is to be understood that this example is given by way of illustration and not of limitation.

Example

About 5 lb. of ground or powdered tubers are stirred for approximately 1½ hours at a temperature of 50–55° C. with a solution of 22.7 grams of tartaric acid in 6 liters of water (i. e., about 0.37% tartaric acid solution). The mixture is filtered, the residue is reprocessed with about 5 liters of water containing approximately 25 g. of tartaric acid (i. e., about 0.5% tartaric acid solution), filtered and the combined filtrates are stirred with about 1200 cc. ether. In order to avoid emulsion formation stirring is done in such a manner that no vortex is created. After stratification of the aqueous and ether layers, the layers are separated and the aqueous layer is neutralized using 200 g. of sodium bicarbonate (with care to minimize foaming) and then saturated with 1½ lb. of sodium chloride. The weakly alkaline solution thus obtained is extracted with 1000 cc. of ether, followed by three further extractions with 500 cc. of ether each. During each ether extraction the liquids are stirred about ½ hour avoiding formation of a vortex. The mixtures readily stratify and the ether layers are removed and combined.

The combined ether extracts are washed successively with three 100 cc. portions of water, then stirred for ½ hour with 30 g. of anhydrous sodium sulfate and filtered. The filtrate, a substantially colorless ether solution, is concentrated to a volume of 75 to 100 cc., then carefully diluted with twice its volume of petroleum ether (b. p. 30–60° C.) and permitted to stand at 5° C. for about 2 hours, during which time crystals are deposited.

The clear supernatant liquid is decanted from the crystalline material which then is dissolved in warm ethanol and cooled at 5° C. for 16 hours. Crystals that are deposited are removed, washed with cold ethanol and dried. The product so obtained melts at about 201–202° C.

In the process as above described it is to be understood that other water soluble and substantially neutral salts can be substituted for sodium chloride in saturating the aqueous layer prior to ether extraction. Likewise other substantially neutral drying agents can be substituted for the anhydrous sodium sulfate employed in drying the resulting ether extract.

Modifications may be made in carrying out the

What is claimed is:

1. The process for obtaining aconitine that comprises extracting ground parts of plants of the genus Aconitum with an aqueous solvent selected from the group consisting of water and mildly acidic water to produce a crude aqueous extract, extracting the aqueous extract with ether, stratifying and separating the aqueous layer, neutralizing the aqueous layer, and recovering aconitine from the neutralized aqueous layer.

2. The process for obtaining aconitine that comprises extracting ground parts of plants of the genus Aconitum with an aqueous solvent selected from the group consisting of water and acidified water, having an acid strength equivalent to about 0.37 to 0.5% tartaric acid, to produce a crude aqueous extract, extracting the aqueous extract with ether, stratifying and separating the aqueous layer, neutralizing the aqueous layer, and recovering aconitine from the neutralized aqueous layer.

3. The process for obtaining aconitine that comprises extracting ground parts of plants of the genus Aconitum with mildly acidic water to produce a crude aqueous extract, extracting the aqueous extract with ether, stratifying and separating the aqueous layer, neutralizing the aqueous layer, and recovering aconitine from the neutralized aqueous layer.

4. The process for obtaining aconitine that comprises extracting ground parts of plants of the genus Aconitum with acidified water, having an acid strength equivalent to about 0.37 to 0.5% tartaric acid, to produce a crude aqueous extract, extracting the aqueous extract with ether, stratifying and separating the aqueous layer, neutralizing the aqueous layer, and recovering aconitine from the neutralized aqueous layer.

5. The process for obtaining aconitine that comprises extracting ground parts of plants of the genus Aconitum with water acidified with about 0.37 to 0.5% of tartaric acid to produce a crude aqueous extract, extracting the aqueous extract with ether, stratifying and separating the aqueous layer, neutralizing the aqueous layer, and recovering aconitine from the neutralized aqueous layer.

EDWARD F. ROGERS.

REFERENCES CITED

The following references are of record in the file of this patent:

UNITED STATES PATENTS

| Number | Name | Date |
| --- | --- | --- |
| 1,416,205 | Huff | May 16, 1922 |
| 1,435,187 | Stoll | Nov. 14, 1922 |
| 1,447,400 | Stoll | Mar. 6, 1923 |

OTHER REFERENCES

Henry, Plant Alkaloids (1913), p. 340–342.
Henry, Plant Alkaloids (1913), p. 344.
Barrowcliff et al., "Organic Medicinal Chemicals" (Van Nostrand Co., New York, 1920), page 87.